No. 824,721. PATENTED JULY 3, 1906.
G. HUNTLEY.
DRILL COUPLING.
APPLICATION FILED MAY 20, 1905.

Witnesses
John W. Bryan
L. B. Bridges

Inventor
George Huntley
By Davis & Davis
Associate Attorneys

UNITED STATES PATENT OFFICE.

GEORGE HUNTLEY, OF PITTSTON, PENNSYLVANIA.

DRILL-COUPLING.

No. 824,721.     Specification of Letters Patent.     Patented July 3, 1906.

Application filed May 20, 1905. Serial No. 261,468.

*To all whom it may concern:*

Be it known that I, GEORGE HUNTLEY, a citizen of the United States of America, and a resident of Pittston, county of Luzerne and State of Pennsylvania, have invented certain useful and new Improvements in Drill-Couplings, of which the following is a full and clear specification, reference being had to the accompanying drawings, in which—

Figure 1:
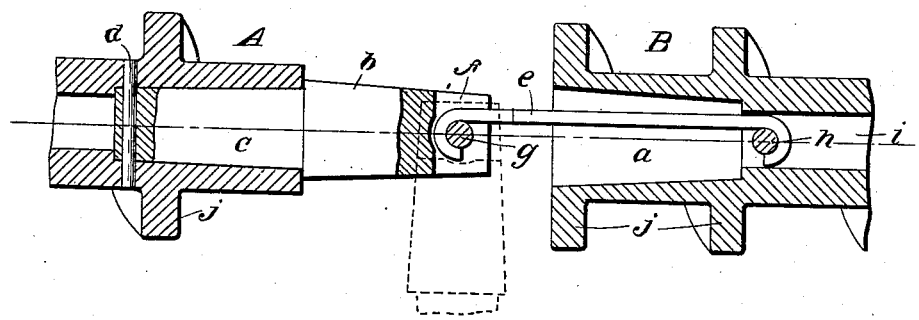
Figure 2:
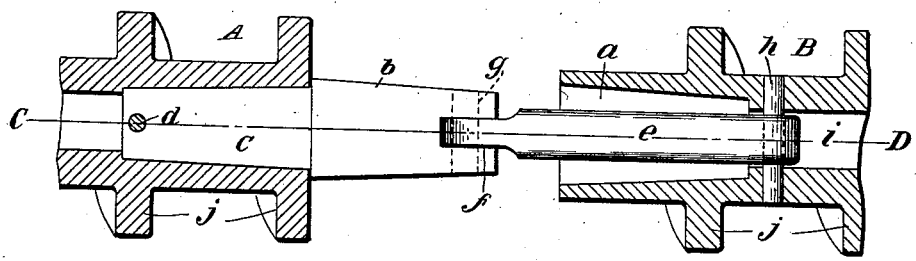
Figure 3:
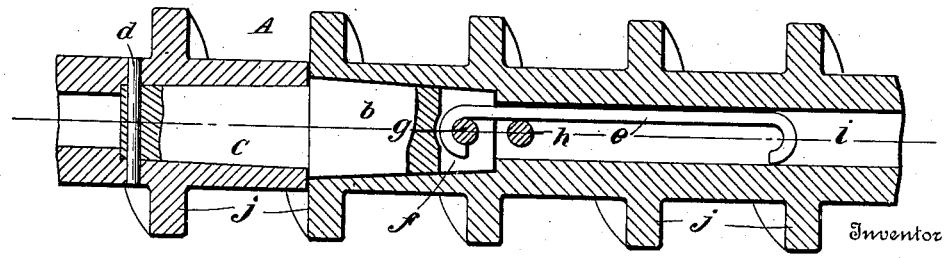

Figure 1 is a vertical longitudinal section through line C D, showing coupling pulled apart ready to disconnect same and constructed according to my invention. Fig. 2 is a horizontal longitudinal section of said coupling and showing coupling pulled apart ready to disconnect same; and Fig. 3 is a vertical longitudinal section through line C D, showing coupling connected and in place adapted to the purpose for which it is intended.

The present method used to connect drills together is as shown on my invention as per drawings, with the exception of parts shown to be my invention—*i. e.*, simply a socket $a$ and dowel $b$, said dowel being held in socket by means of a movable pin through both $a$ and $b$ when the parts are in connection. Thus to take the sections apart it is necessary to remove the pin, which sometimes becomes broken or removed in extricating the drill from the hole that has been bored by said drill, thus allowing part of drill marked B to remain in the hole, or the connecting-pin becoming bent by constant use cannot be extracted from the drill, causing great trouble in disconnecting parts of the drill.

It is the object of my invention to overcome these objections by providing a simple coupling that, it will be easily seen, can be readily taken apart or connected at will and will also prevent parts of the drill from being disconnected while said drill is being operated or extracted from any excavation, &c., all as shown and described.

To the accomplishment of this object and such others as may hereinafter appear my invention consists of the parts and combination of parts hereinafter fully set forth, and particularly pointed out in the appended claims, reference being had to the accompanying drawings, forming a part of this specification, in which the same reference characters designate like parts in the several views.

Referring to the drawings by reference characters, the letters A and B designate two parts of drills or a drill requiring to be connected together in a substantial manner and in which $a$ designates a socket or recess-receiving dowel or connection $b$ of the other part of the drill. Fastened into part of drill marked A is a similar dowel and socket $c$, set and held in place by a stationary and permanent pin $d$, as shown. Dowel $b$ in part A of drill is connected to part B of drill by means of a slide or link $e$, said dowel $b$ being slotted vertically in the end, as at $f$, and provided with a stationary pin $g$, thus engaging one end of slide or link $e$, as shown. Slide or link $e$ engages part of drill B by means of a stationary pin $h$ when said slide or link $e$ is drawn out, as shown on Figs. 1 and 2.

When the coupling is made and parts of drill A and B are in place, slide or link $e$ is forced along passage $i$ and is therefore out of the way. Wormed flanges on parts of drill are shown at $j$. When it becomes necessary to disconnect the coupling, dowel $b$ is drawn from socket $a$ and slide or link $e$ engages pin $h$, thereby preventing part A from becoming entirely disconnected from part B. The object of this is that in withdrawing drill out of excavation that has been made by the drill the part of drill B will be withdrawn at the same time, and from this point, as shown in Figs. 1 and 2, parts can be entirely detached by bending part A downward at an angle of ninety degrees, as shown on Fig. 1, thus unhooking dowel $b$ from slide or link $e$, that is engaged by pin $g$.

It will be readily seen by those skilled in the art that various mechanical embodiments of the invention are possible. Therefore I do not wish to be limited to the exact arrangement and construction as herein shown and described.

What I claim, and desire to secure by Letters Patent, is—

1. In a coupling of the class set forth, the combination of two adjoining sections one being provided with a socket and the other with a dowel adapted to fit into the same, the dowel being slotted across its end and having a pin extending across said slot, and the socketed member being hollow and having a pin extending across this hollow near the inner end of the socket, and a sliding connection consisting of a link having an open hook at one end engaging the pin carried by the dowel and adapted to be detached therefrom, said link having a hook adapted to engage the pin carried by said hollow member.

2. In combination with adjoining sections of a drill, one section being socketed and the other being provided with a dowel, of a sliding link connection between the socket member and the end of the dowel, one end of this connection being detachable.

3. The combination with two adjoining drill-sections one section being socketed and the other section being provided with a dowel, and a connecting-link having a pivotal and detachable connection to the end of the dowel and a sliding connection with the socket member.

4. In combination, two adjoining drill-sections one carrying a dowel and the other being provided with a socket and a hollow portion connecting with the socket, and a connecting-link having a pivotal and detachable connection with the end of the dowel and having its other end slidable in the hollow portion of the socket member, substantially as set forth.

In testimony whereof I have signed my name to this specification in the presence of two subscribing witnesses.

GEORGE HUNTLEY.

Witnesses:
 W. H. GILLESPIE,
 BENJ. A. CROWTHER.